United States Patent
Teboulle (10) Patent No.: US 11,592,316 B2
(45) Date of Patent: Feb. 28, 2023

(54) METHOD FOR READING METERS FOR FLUIDS

(71) Applicant: SAGEMCOM ENERGY & TELECOM SAS, Rueil Malmaison (FR)

(72) Inventor: Henri Teboulle, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 120 days.

(21) Appl. No.: 16/839,914

(22) Filed: Apr. 3, 2020

(65) Prior Publication Data
US 2020/0348149 A1 Nov. 5, 2020

(30) Foreign Application Priority Data
Apr. 30, 2019 (FR) .................................... 1904592

(51) Int. Cl.
*G01D 4/00* (2006.01)
*H04B 3/54* (2006.01)
(Continued)

(52) U.S. Cl.
CPC .............. *G01D 4/004* (2013.01); *G01D 4/02* (2013.01); *G06Q 50/06* (2013.01); *H04B 3/546* (2013.01);
(Continued)

(58) Field of Classification Search
CPC ................... H04W 12/50; H04B 3/546; H04B 2203/5429; H04B 2203/5431;
(Continued)

(56) References Cited

U.S. PATENT DOCUMENTS

| 11,359,933 B2 * | 6/2022 | Wenger | G01D 4/002 |
| 2005/0240540 A1 * | 10/2005 | Borleske | G06Q 30/04 |
| | | | 705/401 |

(Continued)

FOREIGN PATENT DOCUMENTS

CN 105185075 A 12/2015

OTHER PUBLICATIONS

Dec. 4, 2019 Search Report issued in French Patent Application No. 1904592.

*Primary Examiner* — Blane J Jackson
(74) *Attorney, Agent, or Firm* — Oliff PLC (57) ABSTRACT

A system, referred to as a reading system, used in an automated metering management system in the context of a fluid-distribution service comprising a plurality of fluid meters is disclosed. The first communication module in accordance with a wireless communication standard is used by each fluid meter and a second communication module suitable for communicating by powerline with a data concentrator via a first network, said data concentrator communicating with a management entity of the automated metering management system via a second network. Instancing an application emulating a virtual fluid meter able to communicate directly with the data concentrator for each fluid meter in the plurality, and, for each fluid meter in the plurality, the corresponding virtual fluid meter takes responsibility for retransmitting information representing a fluid-consumption reading, said information having been supplied to the reading system by said fluid meter to the management entity via the data concentrator.

12 Claims, 7 Drawing Sheets

(51) Int. Cl.
*H04W 12/50* (2021.01)
*G01D 4/02* (2006.01)
*G06Q 50/06* (2012.01)

(52) U.S. Cl.
CPC ..... *H04W 12/50* (2021.01); *H04B 2203/5433* (2013.01); *H04B 2203/5441* (2013.01)

(58) Field of Classification Search
CPC .. H04B 2203/5441; H04B 3/54; G06Q 50/06; G01D 4/002; G01D 4/004; G01D 4/00
See application file for complete search history.

(56) References Cited

U.S. PATENT DOCUMENTS

| | | | | |
|---|---|---|---|---|
| 2008/0117077 | A1* | 5/2008 | Ratiu | G01D 4/004 340/870.02 |
| 2008/0177678 | A1* | 7/2008 | Di Martini | G06Q 10/06 705/412 |
| 2014/0167981 | A1 | 6/2014 | Pontin et al. | |
| 2016/0093001 | A1* | 3/2016 | Dherbecourt | G06Q 50/06 705/412 |
| 2020/0408565 | A1* | 12/2020 | Lee | G01D 4/002 |

* cited by examiner

METHOD FOR READING METERS FOR FLUIDS

TECHNICAL FIELD

The present invention relates to a method for the automated remote reading of meters for fluids such as water or gas meters, executed in an automated metering system in the context of a fluid-distribution service, as well as a system and devices implementing said method.

PRIOR ART

For reasons of efficiency and rationalisation, the electricity, gas and water suppliers have sought to automate the reading of the consumptions of their customers, avoiding having recourse to the travel of operators in order to perform the readings. The electricity distribution networks are particularly suited to automated remote readings of the electricity meters since they offer an infrastructure allowing powerline communications. Powerline communication networks for automated metering management AMM systems have made their appearance over the past few years. In such powerline communication networks, communications are established between electricity meters, referred to as smart electricity meters, and a concentrator node, sometimes referred to as a data concentrator or base node or coordinator, in order in particular to allow remote automated reading of electricity consumption measurements performed by said smart electricity meters. A plurality of data concentrators are then geographically deployed in order to distribute the metering reading collection load on the smart electricity meters. Each data concentrator then serves as a relay between the smart electricity meters that are connected thereto and a management entity of the automated metering management system AMM that is responsible for processing the metering readings in a centralised manner.

Unlike the electricity distribution infrastructures, the water and gas distribution infrastructures cannot serve as communication infrastructures. Despite everything, the trend towards the rationalisation of readings has also affected the gas and water suppliers. The gas and water meters, also referred to hereinafter as fluid meters, have also become smart and solutions allowing automatic remote reading of these meters have been developed. These solutions rely in particular on the WM-Bus communication standard (NF EN 13757-4, "Communication systems for meters and remote reading of meters—Part 4: Wireless meter readout (Radio meter reading for operation in SRD bands)" in English terminology). The WM-Bus standard is a wireless communication standard offering an excellent compromise between small space requirement for antennas and long range both indoors and outdoors (up to 1 km without repeaters). Having a unidirectional or bidirectional character according to the implementation modes, the WM-Bus standard allows remote actions by a control centre. Deploying a WM-Bus communication infrastructure requires the installation of a modem with a long independent service life (up to 12 years for a lithium supply) on each fluid meter and a central concentrator (one central concentrator per building of 6 to 7 storeys on average) responsible for collecting the information read and transmitting it to a management entity.

It is known that fluid meters are generally close to electricity meters. It therefore appears suboptimal to create a communication infrastructure dedicated to fluid meters whereas a communication infrastructure is available close by for reading electricity meters.

It is then desirable to overcome these drawbacks of the prior art. It is in particular desirable to provide a solution that makes it possible to collect consumption information measured by fluid meters by means of a powerline communication network for automated metering management systems AMM used in an electricity distribution network.

DISCLOSURE OF THE INVENTION

According to a first aspect of the invention, the invention relates to a method for the remote automated reading of a fluid meter executed in an automated metering management system in the context of a fluid-distribution service, comprising a fluid meter and a system, referred to as a centralised-meter system, the fluid meter being able to transmit frames in accordance with a wireless communication standard to the centralised-meter system, the centralised-meter system being able to receive said frames and to communicate by powerline with a data concentrator in a first frequency band via a first network of the powerline communication network type, said data concentrator communicating with a management entity of the automated metering management system via a second network. The method comprises: performing a phase of pairing between the centralised-meter system and the fluid meter wherein the centralised-meter system considers itself to be paired with the fluid meter when it receives at least one signalling frame from said fluid meter and, when it is paired with the fluid meter, instances an emulation application emulating a virtual fluid meter able to communicate directly with the data concentrator on behalf of said fluid meter; performing an index transmission phase during which the centralised-meter system receives frames from the fluid meter each comprising information representing a fluid-consumption reading, the virtual fluid meter taking responsibility for retransmitting said information representing a fluid-consumption reading to the management entity via the data concentrator.

The method of the invention therefore makes it possible to collect consumption information measured by fluid meters by means of a powerline communication network for automated metering management systems AMM implemented in an electricity distribution network.

According to one embodiment, the pairing phase further comprises, following the reception by the centralised metering system of a signalling frame among a plurality of signalling frames transmitted by the fluid meter during the pairing phase, transmitting, from the centralised metering system, to the fluid meter, a frame comprising information representing a successful pairing, the reception of the frame comprising the information representing the successful pairing by the fluid meter ending the transmission of the plurality of signalling frames.

According to one embodiment, during the index transmission phase, the centralised-meter system fixes a predefined duration of standby of the fluid meter, the fluid meter going on standby for a predefined period after each sending of a frame comprising information representing a fluid-consumption reading.

According to one embodiment, the centralised-meter system transmits a frame, referred to as a reading frame, requesting the sending of a frame comprising information representing a fluid-consumption reading to the fluid meter in order to obtain from the fluid meter a frame comprising information representing a fluid-consumption reading.

According to one embodiment, the signalling frame enabling the centralised-meter system to consider itself to be paired with the fluid meter during the pairing phase forms part of a plurality of signalling frames transmitted by the fluid meter during a predefined period.

According to one embodiment, the frames comprising information representing a fluid-consumption reading coming from the fluid meter during the index transmission phase are sent at regular predefined intervals, the fluid meter going on standby between each sending.

According to one embodiment, the centralised-meter system comprises a centralised meter and an intermediate unit associated with a fluid meter, the centralised meter and the intermediate unit being two separate devices able to communicate with one another by powerline in a second frequency band via a third network of the powerline communication network type. During the pairing phase, the intermediate unit receives each signalling frame sent by the fluid meter and considers that the centralised-meter system and the fluid meter are paired when it receives a signalling frame following reception of a frame containing information representing a pairing request from the centralised meter.

According to one embodiment, in the event of successful pairing between the fluid meter and the centralised-meter system, the intermediate unit transmits a frame containing information representing a successful pairing to the centralised meter, a reception of a frame containing information representing a successful pairing by the centralised meter causing an obtaining, by the centralised meter, of an encryption key corresponding to said fluid meter and a transmission, by the centralised meter to the intermediate unit, of said encryption key so that each communication between said fluid meter and the intermediate unit can be encrypted.

According to one embodiment, each transmission of a reading frame by the centralised-meter system comprises a transmission of a first reading frame by the intermediate unit to the fluid meter, the transmission of said first reading frame being caused by the reception of a second reading frame from the centralised meter.

According to one embodiment, the emulation application emulating a virtual fluid meter is instanced by the centralised meter, each frame comprising information representing a fluid-consumption reading received by the centralised-meter system is received by the intermediate unit, which retransmits it to the centralised meter so that the virtual fluid meter that it has instanced can retransmit said information representing a fluid-consumption reading to the management entity via the data concentrator.

According to a second aspect of the invention, the invention relates to a system, referred to as a reading system, used in an automated metering management system in the context of a fluid-distribution service, said automated metering management system comprising a plurality of fluid meters. The reading system comprises at least one first communication module in accordance with a wireless communication standard used by a fluid meter and a second communication module suitable for communicating by powerline with a data concentrator in a first frequency band via a first network of the powerline communication network type, said data concentrator communicating with a management entity of the automated metering management system via a second network, and in that the reading system comprises means for instancing an emulation application emulating a virtual fluid meter able to communicate directly with the data concentrator for each fluid meter in the plurality, and, for each fluid meter in the plurality, the corresponding virtual fluid meter takes responsibility for retransmitting information, representing a fluid-consumption reading, supplied to the reading system by said fluid meter in the plurality to the management entity via the data concentrator.

According to one embodiment, the reading system comprises at least one intermediate unit, each intermediate unit comprising a communication module identical to the first communication module and being associated with a fluid meter in the plurality of the water meter type and/or a fluid meter in the plurality of the gas meter type, and a centralised meter comprising the second communication module and the means for instancing an emulation application emulating a virtual fluid meter able to communicate directly with the data concentrator for each fluid meter in the plurality, each intermediate unit and the centralised meter comprising a communication module suitable for communicating with each other by powerline in a second frequency band via a third network of the powerline communication network type.

According to a third aspect of the invention, the invention relates to a device, referred to as an intermediate unit, used in an automated metering management system in the context of a fluid-distribution service, said automated metering management system comprising a plurality of fluid meters. The intermediate unit is associated with a fluid meter in the plurality of the water meter type and/or a fluid meter in the plurality of the gas meter type and comprises a first communication module in accordance with a wireless communication standard used by each fluid meter in the plurality and a second communication module suitable for communicating by powerline with a device, referred to as a centralised meter, in a first frequency band via a first network of the powerline communication network type, said centralised meter itself being suitable for communicating by powerline in a second frequency band via a second network of the powerline communication network type with a data concentrator, said data concentrator communicating with a management entity of the automated metering management system via a third network, the intermediate unit being able to relay information representing fluid consumption transmitted by each fluid meter to which said unit is attached to the centralised meter so that said centralised meter can relay said information to the management entity via the data concentrator.

According to a fourth aspect of the invention, the invention relates to a device, referred to as a centralised meter, used in an automated metering management system in the context of a fluid-distribution service, said automated metering management system comprising a plurality of fluid meters, the centralised meter is associated with at least one intermediate unit according to the third aspect and comprises a third communication module for communicating by powerline with each intermediate unit in a first frequency band via the first network and a fourth communication module for communicating by powerline in a second frequency band via the second network with the data concentrator, and means for instancing an emulation application emulating a virtual fluid meter able to communicate directly with the data concentrator for each fluid meter in the plurality, and, for each fluid meter in the plurality, the corresponding virtual fluid meter takes responsibility for retransmitting information, representing a fluid-consumption reading, supplied to the reading system by said fluid meter in the plurality to the management entity via the data concentrator.

BRIEF DESCRIPTION OF THE DRAWINGS

The features of the invention mentioned above, as well as others, will emerge more clearly from a reading of the following description of at least one example embodiment, said description being given in relation to the accompanying drawings, among which.

DETAILED DISCLOSURE OF EMBODIMENTS

Figure 1:
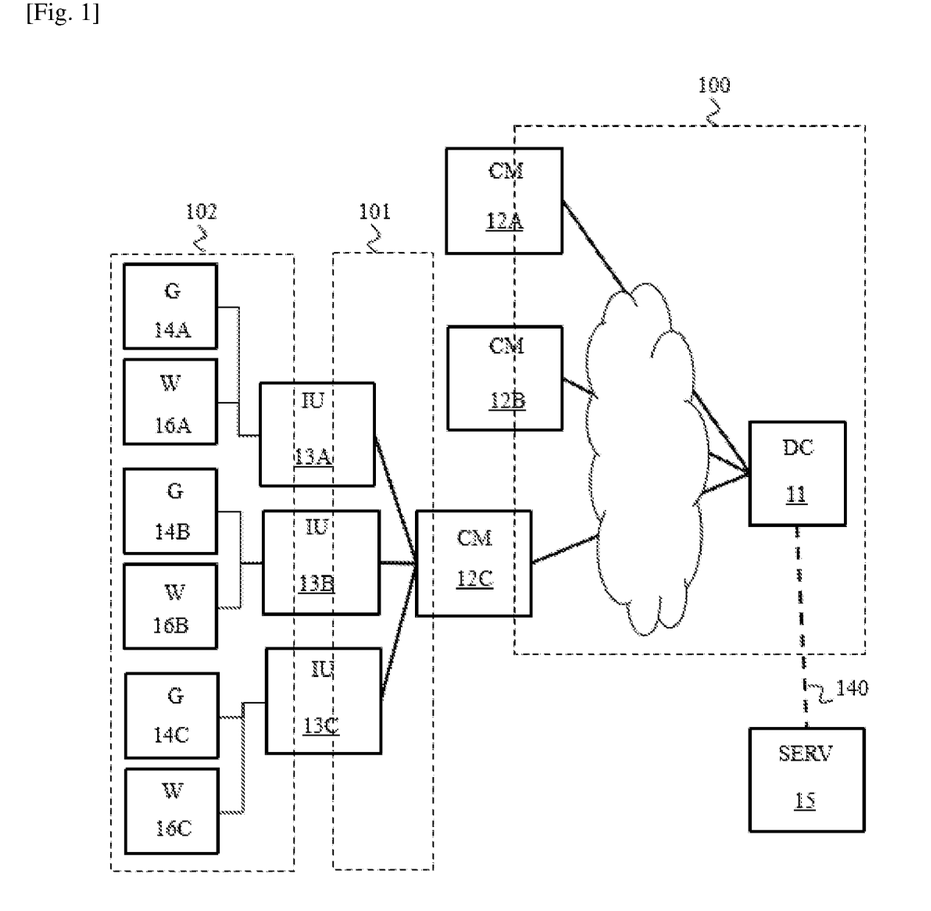
FIG. 1 illustrates schematically a communication system, supporting an automated remote reading of metering information from fluid meters, in which the present invention is implemented.

FIG. 1 thus illustrates a communication system supporting an automated remote reading of metering information from fluid meters, in which the present invention is implemented. The communication system comprises at least one powerline communication network (PLCN) 100, simply referred to hereinafter as a PLCN network 100, deployed logically on an electricity distribution network. The PLCN network 100 enables an automated metering management system AMM to be established in the context of electricity distribution services.

The communication system comprises a device, referred to as a data concentrator DC 11. The PLCN network 100 is intended to make it possible to connect a plurality of node devices to the data concentrator DC 11. The node devices that the PLCN network 100 aims to connect to the data concentrator DC 11 comprise at least one centralised meter CM. In FIG. 1, the communication system comprises three centralised meters 12A, 12B and 12C. The node devices connected to the data concentrator DC 100 could also comprise smart electricity meters (not shown in FIG. 1).

The PLCN network 100 thus makes it possible to establish powerline communications so that the data concentrator DC 11 can in particular communicate with the centralised meters CM 12A, 12B and 12C. The powerline communications via the PLCN network 100 are preferentially in accordance with the G3-PLC protocol specified in the ITU-T recommendation G.9903. In a variant, the powerline communications via the PLCN network 100 are preferentially in accordance with the PRIME specifications ("PoweRline Intelligent Metering Evolution" as defined in the ITU normative document G.9904). The communication system further comprises an entity for managing the automated metering management system AMM that is in particular responsible for processing the metering readings in a centralised manner. The management entity of the automated metering management system AMM, simply referred to hereinafter as the management entity, takes the form of a server 15, or set of servers, to which the data concentrator DC 11 is connected via a communication link 140. The communication link 140 is a wireless communication link, for example of the GPRS ("General Packet Radio Service"), UMTS ("Universal Mobile Telecommunication System") or LTE ("Long-Term Evolution") type. The communication link 140 may in a variant be a cable communication link.

Each centralised meter CM 12A, 12B and 12C is connected to at least one intermediate unit IU. In FIG. 1, only units IU 13A, 13B and 13C connected to the centralised meter CM 12C have been depicted.

Each intermediate unit IU 13A, 13B and 13C is connected to a fluid meter, that is to say to a water meter and/or a gas meter. For example, the intermediate unit IU 13A (respectively 13B and 13C) is connected to a gas meter G 14A (respectively 14B and 14C) and to a water meter W 16A (respectively 16B and 16C). Like any meter, each fluid meter (G 14A, 14B and 14C and W 16A, 16B and 16C) is responsible for metering consumptions (of water or gas).

According to a method that we detail hereinafter in relation to FIGS. 4, 5, 6 and 7, each fluid meter transmits information representing consumptions to the intermediate units 13A, 13B and 13C. To do this, use is made of a communication network 102 between the fluid meters (G 14A, 14B and 14C and W 16A, 16B and 16C) and the intermediate units IU (13A, 13B and 13C) based on the WM-Bus communication standard.

Each intermediate unit IU is next responsible for transferring the information representing consumptions from each fluid meter with which it is associated to a centralised meter. To do this, it uses a powerline communication network 101 connecting the intermediate units IU to the centralised meters CM. The powerline communication network 101 is distinct from the PLCN network 100. Each intermediate unit IU is connected, in a logic manner, directly to the centralised meter CM with which it is associated. For example, the intermediate units IU 13A, 13B and 13C are connected, in a logic manner, directly to the centralised meter CM 12C. The network 101 connecting the intermediate units IU 13A, 13B and 13C to the centralised meter CM 12C thus has a star topology, whereas the PLCN network 100 has a mesh topology, as in the context of the G3-PLC protocol, or a spanning tree topology as in the context of the PRIME specifications.

Each intermediate unit IU therefore serves as a gateway between two worlds: a first world of the readings from fluid meters using a wireless communication network based, in one embodiment, on the WM-Bus standard, and a second world of readings from electricity meters using a powerline communication network. Whereas a fluid meter is not capable of communicating directly with the data concentrator DC 11 over the PLCN network 100, the assembly formed by the intermediate unit IU to which this fluid meter is attached and the centralised meter CM to which this intermediate IU is attached forms a centralised-meter system capable of relaying information coming from the fluid meter to the data concentrator DC 11 via the powerline communication network 100. For example, the centralised meter CM 12C and the intermediate unit 13A form a first centralised-meter system. The centralised meter CM 12C and the intermediate unit 13B form a second centralised-meter system different from the first centralised system, even if they have the centralised meter CM 12C in common. Each centralised-meter system is associated with a fluid meter of the water meter type and/or a fluid meter of the gas meter type. For example, the first centralised-meter system is associated with the gas meter G 14A, and with the water meter W 16A.

Once collected by the centralised meter CM 12C, the information representing consumptions is transferred to the data concentrator DC 11 using the PLCN network 100, and then from the data concentrator DC 11 to the management entity 15 using the network 140.

Each centralised-meter system, for example the centralised-meter system formed by the centralised meter CM 12C and the intermediate unit IU 13A, serves as a proxy device for at least one fluid meter. For example, the centralised-meter system formed by the centralised meter CM 12C and the intermediate unit IU 13A serves as a proxy device for the fluid meter G 14A. From the point of view of the PLCN network 100 and therefore of the data concentrator DC 11, the fluid meters are masked by the centralised-meter systems. In other words, each centralised-meter system emulates, vis-à-vis the data concentrator DC 11, a fluid-meter behaviour similar to the behaviour of a smart electricity meter for each fluid meter that is attached thereto.

In one embodiment, so as to ensure that each fluid meter is masked from the data concentrator DC 110, distinct frequency bands are used. The fact that the fluid meters are masked from the data concentrator DC 110 advantageously makes it possible to simplify the system for reading these meters. This is because the masked meters do not directly exchange data with the data concentrator DC 110. Consequently, whether they are unidirectional or bidirectional, they do not have to know the G3-PLC encryption keys used between the intermediate unit 13A and the centralised meter 12C. The fluid meter uses its own encryption key, which it knows implicitly, in order to dialogue with the intermediate unit 13A. The powerline communications over the PLCN network 100 therefore use a first frequency band and the powerline communications over the network 101 use a second frequency band distinct from the first frequency band and not overlapping with the first frequency band. For example, the G3-PLC protocol and the PRIME specifications define various distinct frequency bands that can be used, in particular: a first CENELEC-A frequency band, which ranges approximately from 35 kHz to 91 kHz; a second FCC frequency band, which ranges approximately from 150 kHz to 480 kHz; a third CENELEC-B frequency band, which ranges approximately from 98 kHz to 122 kHz. In one embodiment, the communications over the powerline communication network 100 use the CENELEC-A frequency band and the communications over the powerline communication network 101 use the FCC frequency band.

In one embodiment, the communication network 102 is based on the LoRa (registered trade mark) ("Long Range") technology.

In the embodiment of the communication system described above in relation to FIG. 1, each intermediate unit IU is separated from the centralised meter CM to which it is attached. In this embodiment, each centralised meter CM is intended to equip a property complex, such as a building or a residential district, in which each premises or dwelling is equipped with an intermediate unit IU that relays information representing consumptions coming from fluid meters to said centralised meter CM. This embodiment makes it possible to have centralised meters CM having complexity almost equivalent to a conventional smart electricity meter and intermediate units IU of low complexity, responsible solely for relaying information representing consumptions of fluids coming from fluid meters. This is because the intermediate units IU comprise only basic elements such as WM-Bus and G3-PLC communication interfaces. In particular, these intermediate units IU do not comprise a display, or application parts for which the centralised meters take responsibility via emulation applications of the fluid meters. In this way, the cost of the communication system is reduced compared with a conventional communication system in which each dwelling and each premises would be equipped with a smart electricity meter.

However, some configurations of dwellings or premises do not make it possible to connect the same centralised meter CM to a plurality of intermediate units IU. This is the case in particular with isolated dwellings or premises. Despite everything, the same need to use a powerline communication network for automated metering management systems AMM for reading fluid meters exists for these dwellings or premises. In one embodiment, each dwelling or premises is equipped with a smart electricity meter responsible for making readings of electricity consumptions. In a first variant, each fluid meter in said dwelling is associated with an intermediate unit IU responsible for relaying information representing consumptions to the smart electricity meter. The smart electricity meter is then connected to the intermediate unit IU in the same way as a centralised meter CM is connected to each intermediate unit IU. In a second variant, the smart electricity meter integrates an intermediate unit IU, or more precisely integrates all the functionalities of the intermediate unit IU. In these two variants, the smart electricity meter fulfils the same role as the centralised meter CM 120.

It should be noted that an assembly formed by a centralised meter CM and intermediate units IU that are attached thereto, whether or not they are integrated in the centralised meter, forms a reading system.

Figure 2:
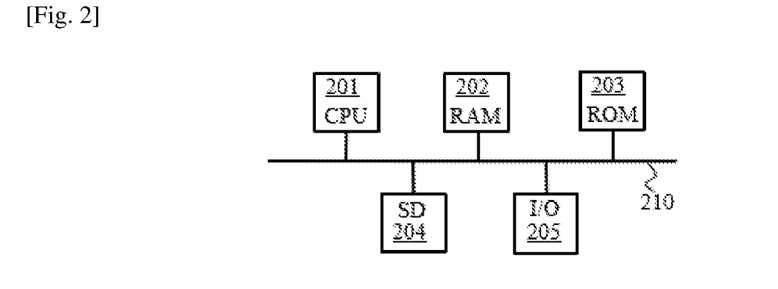
FIG. 2 illustrates schematically an example of hardware arrangement of a control unit used in the communication system.

FIG. 2 illustrates schematically an example of a hardware arrangement of a control module used in the communication system of FIG. 1. Such a control module is situated in each processing unit IU 13A, 13B and 13C, in the centralised meter CM 120, and in each fluid meter G 14A, 14B and 14C and W 16A, 16B and 16C as detailed below in relation to FIGS. 3A, 3B and 3C. When the intermediate unit IU is integrated in a smart electricity meter, the control module is situated in the smart electricity meter as described in FIG. 3D. The example of hardware architecture presented comprises, connected by a communication bus 210: a processor CPU 201; a random access memory RAM 202, a read only memory ROM 203 and a flash memory; a storage unit or a storage medium reader, such as an SD (Secure Digital) card reader 204; and a set of input/output interfaces I/O 205. The set of input/output interfaces I/O 205 enables the control module to communicate with other components in one and the same device, as detailed below in relation to FIGS. 3A, 3B, 3C and 3D.

The processor CPU 201 is capable of executing instructions loaded in the RAM memory 202 from the ROM memory 203, from an external memory (such as an SD card), from a storage medium or from a communication network. On powering up, the processor CPU 201 is capable of reading instructions from the RAM memory 202 and executing them. These instructions form a computer program causing the implementation, by the processor CPU 201, of all or some of the methods and steps described hereinafter in relation to FIGS. 4, 5, 6 and 7.

Thus all or some of the methods and steps described in relation to FIGS. 4, 5, 6 and 7 can be implemented in software form by the execution of a set of instructions by a programmable machine, such as a DSP (digital signal processor) or a microcontroller or a processor. All or some of the methods and steps described in relation to FIGS. 4, 5, 6 and 7 may also be implemented in hardware form by a machine or a dedicated component, such as an FPGA (field-programmable gate array) or an ASIC (application-specific integrated circuit). Thus the control module comprises the electronic circuitry suitable and configured for implementing the methods and steps described in relation to FIGS. 4, 5, 6 and 7.

Figure 3A:
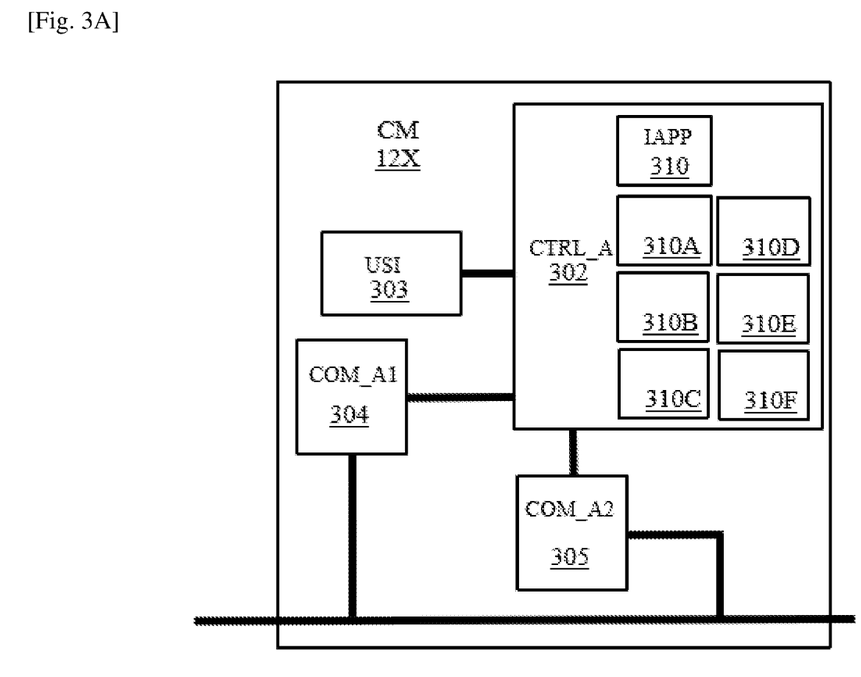
FIG. 3A illustrates schematically an arrangement of a centralised meter of the communication system.

FIG. 3A illustrates schematically an example of an arrangement of a centralised meter CM 12X.

The centralised meters CM 12A, 12B and 12C are identical to the centralised meter CM 12X described in relation to FIG. 3A. The centralised meter CM 12X comprises a control module CTRL_A 302 as described in relation to FIG. 2. The control module CTRL_A 302 is responsible for monitoring the functioning of the centralised meter CM 12X.

The centralised meter CM 12X further comprises a first communication module COM_A1 304 intended to make it possible to communicate by powerline with the data concentrator DC 11 via the PLCN network 100. The first communication module COM_A1 304 therefore acts in the first frequency band.

The centralised meter CM 12X further comprises a second communication module COM_A2 305 intended to make it possible to communicate by powerline with each intermediate unit IU attached to said centralised meter CM 12X. The second communication module COM_A2 305 therefore acts in the second frequency band.

The control module CTRL_A 302 implements an internal application IAPP 310. The internal application IAPP 310 is in particular responsible for instancing an emulation application for each fluid meter attached to the centralised meter CM 12X. Each emulation application is hereinafter referred to as a virtual fluid meter. By way of illustration, when the centralised meter CM 12X is the centralised meter CM 12C, as six fluid-meter entities are attached to the centralised meter CM 12C in FIG. 1, FIG. 3A shows six virtual fluid-meter applications 310A, 310B, 310C, 310D, 310E, 310F.

The centralised meter CM 12X may further comprise a user interface module USI 303 suitable for interacting with users. The user interface module USI 303 comprises for example two buttons each making it possible to activate a pairing procedure between a fluid meter and a centralised-meter system comprising the centralised meter 12X.

Figure 3B:
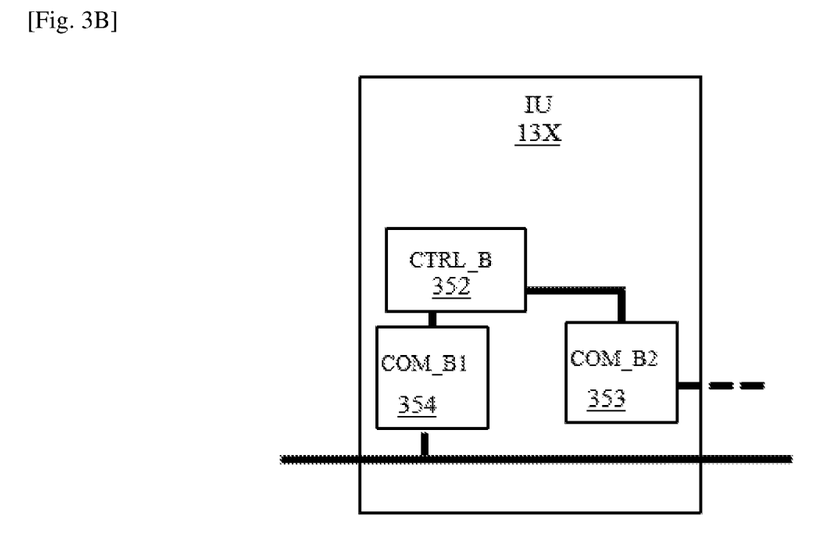
FIG. 3B illustrates schematically an arrangement of an intermediate unit of the communication system.

FIG. 3B illustrates schematically an arrangement of an intermediate unit IU 13X. The intermediate units IU 13A, 13B and 13C are identical to the intermediate unit IU 13X. The intermediate unit IU 13X comprises a control module CTRL_B 352 identical to the control module described in relation to FIG. 2. The control module CTRL_B 352 is responsible for monitoring the functioning of the intermediate unit IU 13X.

The intermediate unit IU 13X further comprises a first communication module COM_B1 354 intended to make it possible to communicate by powerline with the centralised meter CM to which said intermediate unit 13X is attached. The first communication module COM_B1 354 acts in the second frequency band.

The intermediate unit IU 13X further comprises a second communication module COM_B2 353 intended to make it possible to communicate in accordance with the WM-Bus communication standard with each fluid meter with which the intermediate unit IU 13X is associated.

Figure 3C:
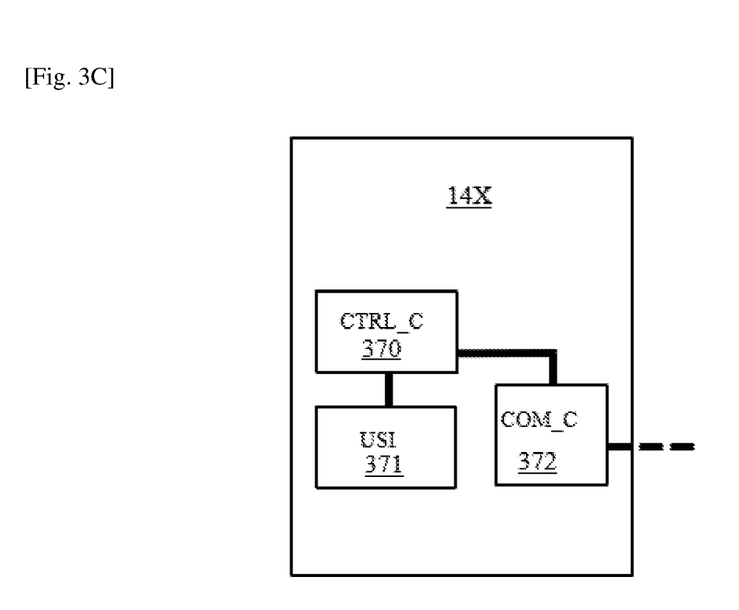
FIG. 3C illustrates schematically an arrangement of a fluid meter.

FIG. 3C illustrates schematically an arrangement of a fluid meter 14X. Such an arrangement is found in the fluid meters G 14A, 14B and 14C and W 16A, 16B and 16C. The fluid meter 14X comprises a control module CTRL_C 370 identical to the control module described in relation to FIG. 2. The control module CTRL_C 370 is responsible for monitoring the functioning of the fluid meter 14X.

The fluid meter 14X may further comprise a user interface module USI 371 suitable for interacting with users. The user interface module USI 371 is for example a button making it possible to activate a procedure for pairing the fluid meter 14X and the centralised-meter system to which the fluid meter is attached.

The fluid meter 14X further comprises a communication module COM_C 372 intended to make it possible to communicate in accordance with the WM-Bus communication standard with the intermediate unit IU with which the fluid meter is associated.

Figure 3D:
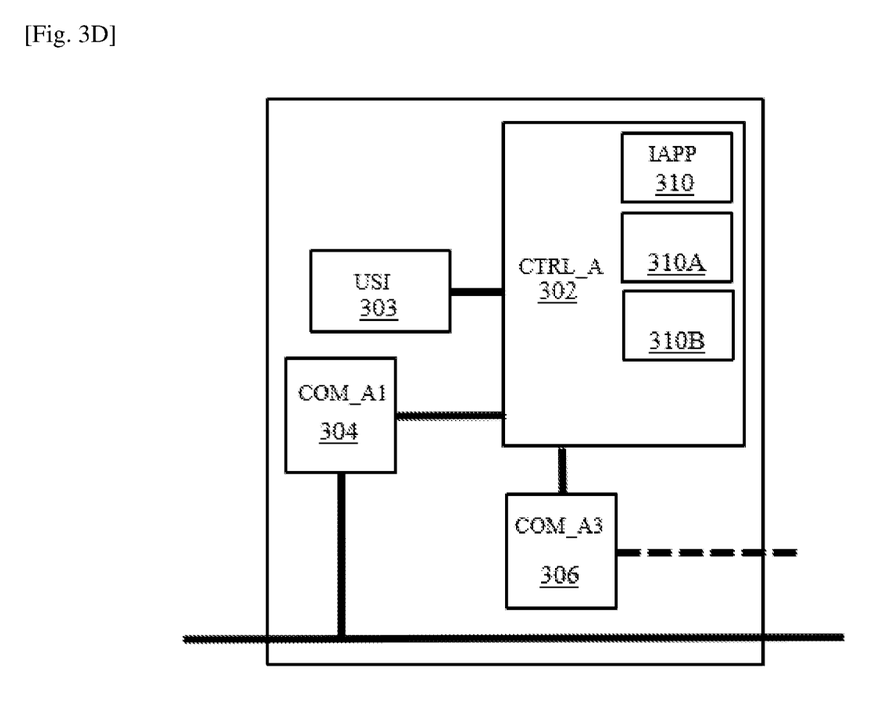
FIG. 3D illustrates schematically an example of arrangement of a smart electricity meter according to one embodiment of the invention.

FIG. 3D illustrates schematically an example of arrangement of a smart electricity meter. The smart electricity meter of FIG. 3D is the meter of the variant in which an intermediate unit IU is integrated in a smart electricity meter. The smart electricity meter comprises the same modules 302, 303 and 304 as the centralised meter CM 12X of FIG. 3A. As in the centralised meter CM 12X, the control module CTRL_A 302 implements an internal application IAPP 310 that instances an emulation application for each fluid meter attached to the smart electricity meter. In the context of this variant, the internal application IAPP 310 has to instance at a maximum only two emulation applications, one for a fluid meter of the water meter type and the other for a fluid meter of the gas meter type. Moreover, in this variant, since the smart electricity meter communicates directly with each fluid meter, the second communication module COM_A2 305 is replaced by a communication module COM_A3 306 making it possible to communicate in accordance with the WM-Bus communication standard with each fluid meter with which the smart electricity meter is associated.

Figure 4:
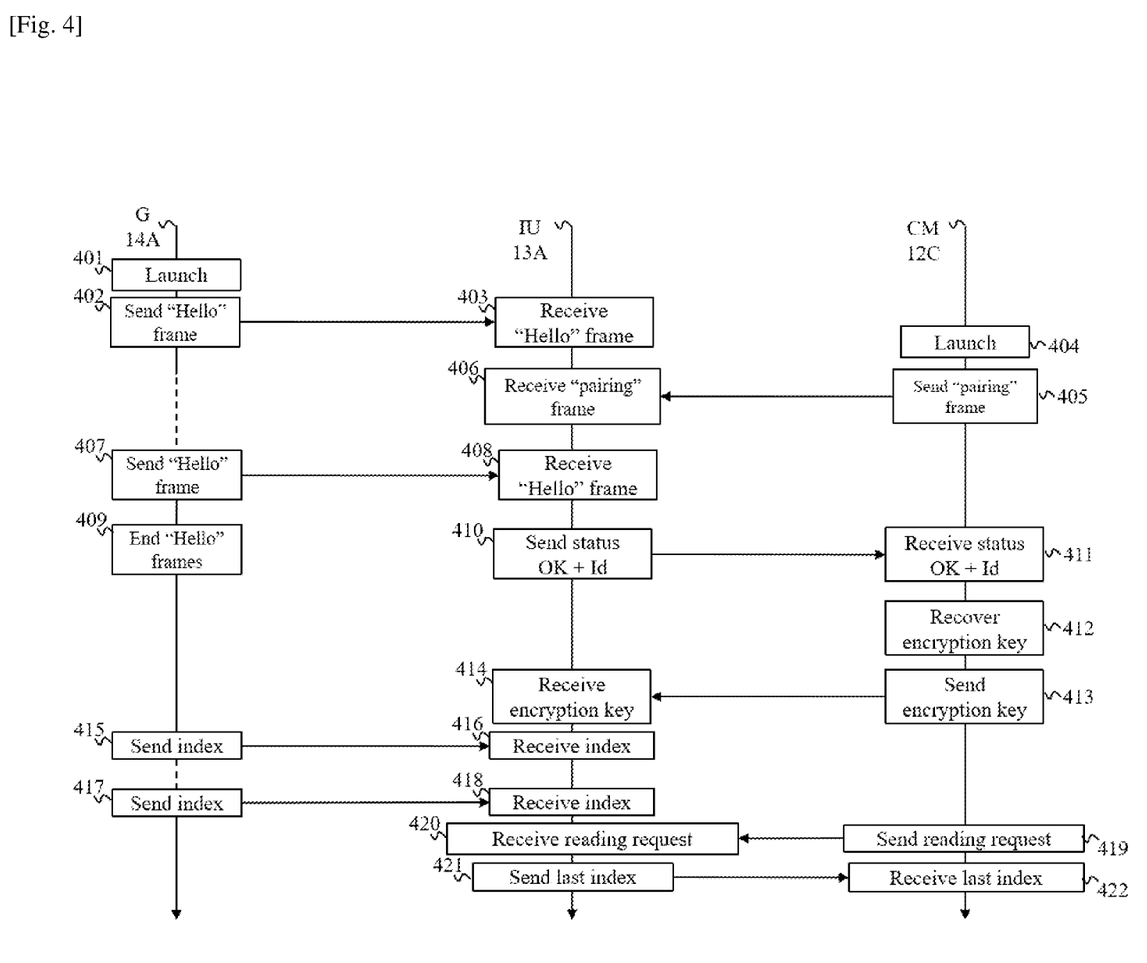
FIG. 4 illustrates schematically a first embodiment of a method for reading fluid meters.

FIG. 4 illustrates schematically a first embodiment of a method for reading fluid meters. In FIG. 4, we have the context of a centralised meter CM separated from the intermediate units IU with which it is associated. Moreover, in FIG. 4, we take the example of exchanges between the centralised meter CM 12C and the fluid meter C 14A by means of the intermediate unit IU 13A. The functioning of the exchanges between the other fluid meters (G 14B, G 14C, W 16A, W 16B and W 16C) and the centralised meter CM 12C via the intermediate units IU 13B and 13C is identical.

All the exchanges between the centralised meter CM 12C and the intermediate unit 13A use frames in accordance with the G3-PLC standard for the physical layer and the data link layer ("Medium Access Control (MAC)") in accordance with the OSI (Open Systems Interconnection) model. In one embodiment, the network layer according to the OSI model is in accordance with the 6LoWPAN (IPv6 Low-Power Wireless Personal Area Networks) protocol as specified in the RFC normative documents 4919 and 4944). Hereinafter, the frames exchanged between the centralised meter CM 12C and the intermediate unit 13A are referred to as G3-PLC frames.

All the exchanges between the intermediate unit 13A and the fluid meter 14A use frames in accordance with the WM-Bus standard for the physical layer and the data link layer. In one embodiment, the network layer according to the OSI model is in accordance with the 6LoWPAN protocol. The frames exchanged between the intermediate unit 13A and the fluid meter 14A are hereinafter referred to as WM-Bus frames.

In one embodiment, the application layer of the G3-PLC and WM-Bus frames is proprietary and specific. In a G3-PLC or WM-Bus frame, this application layer takes the form of a command byte followed by a payload comprising a variable number of bytes. Hereinafter, the G3-PLC or WM-Bus frames going in the direction from fluid meter G 14A to centralised meter CM 12C are referred to as respectively uplink G3-PLC frames and uplink WM-Bus frames, and the G3-PLC or WM-Bus frames going in the direction from centralised meter CM 12C to the fluid meter G 14A are respectively referred to as downlink G3-PLC frames and downlink WM-Bus frames.

In the context of the downlink WM-Bus frames and the downlink G3-PLC frames, the proprietary application layer defines the following command bytes and associated payloads (it should be noted that each command byte takes the form of a hexadecimal value):

"0x00" signifying "reserved" associated with an empty payload;

"0x01" signifying "time set" associated with a payload of six bytes. The first (and respectively the second, third, fourth, fifth and sixth) represent an hour (and respectively minute, second, day, month and year);

"0x02" signifying "reserved" associated with an empty payload;

"0x03" signifying "reserved" associated with an empty payload;

"0x04" signifying "reserved" associated with an empty payload;

"0x05" signifying "reserved" associated with an empty payload;

"0x06" signifying "reserved" associated with an empty payload;

"0x07" signifying "request to read gas meter index" associated with an empty payload;

"0x08" signifying "request to read water meter index" associated with an empty payload;

"0x09" signifying "request for pairing with a gas meter" associated with an empty payload;

"0x0A" signifying "request for pairing with a water meter" associated with an empty payload;

"0x0B" signifying "sending of an encryption key for gas meter" associated with a payload of sixteen bytes representing an encryption key for gas meter;

"0x0C"" signifying "sending of an encryption key for water meter" associated with a payload of sixteen bytes representing an encryption key for water meter;

"0x0D" to "0x0F" signifying "reserved" associated with an empty payload.

In the context of the uplink WM-Bus frames and uplink G3-PLC frames, the proprietary application layer defines the following command bytes and the associated payloads:

"0x00" signifying "reserved" associated with an empty payload;

"0x01" signifying "reserved" associated with an empty payload;

"0x02" signifying "transmission of an index value" associated with a payload comprising a byte representing an index type, 4 index value bytes and 6 timestamp bytes (hour, minute, second, day, month, year). The byte representing an index type takes a value in bytes equal to "0x01" when it is an index of a gas meter, and a value in bytes equal to "0x02" when it is a water meter index. The other possible values of the byte representing an index type signify "reserved".

"0x03" signifying "status" associated with a payload of two bytes. In these two bytes, the bits 0 to 7 and 10 to 15 are reserved for future uses. In the invention, only the bit values 8 and 9 are used, the bit 8 signifying "gas failure" and the bit 9 signifying "water failure".

"0x04" signifying "pairing status" associated with a payload of five bytes. The first byte gives a hexadecimal value representing a type of pairing: the value "0x00" signifies "gas pairing successful"; the value "0x01" signifies "gas pairing failed"; the value "0x02" signifies "water pairing successful"; the value "0x03" signifies "water pairing failed". The other possible values of this byte are reserved for other uses. The following four bytes represent an identifier of the fluid meter.

the values "0x05" to "0xFF" signify "reserved" associated with an empty payload.

FIG. 4 does not show the exchanges between the centralised meter CM 12C and the data concentrator DC 11. As seen above, all the exchanges between the centralised meter CM 12C and the data concentrator 11 use frames in accordance with the G3-PLC standard for the physical layer and the data link layer. In one embodiment, the network layer according to the OSI model is in accordance with the 6LoWPAN protocol. The frames exchanged between the centralised meter CM 12C and the data concentrator DC 11 are hereinafter referred to as DC frames. In one embodiment, the application layer of the DC frames is in accordance with the DLMS/COSEM standard ("Device Language Message Specification/Companion Specification for Energy Metering"), as described in the IEC normative document 62056-5-3 and in the 12$^{th}$ edition of the document "Bluebook: COSEM Interface Classes and OBIS Object Identification System" published by the DLMS User Association.

In the embodiment in FIG. 4, the fluid meter G 14A is unidirectional, that is to say it can only send frames. The fluid meter G 14A cannot therefore receive frames.

In a step 401, a user presses the button on the user interface USI 371 of the fluid meter G 14A. The control module CTRL_C 370 of the fluid meter G 14A captures this action on the button.

In a step 402, the control module CTRL_C 370 causes the sending, by the communication module COM_C 372, of signalling messages during a predefined period, each signalling message taking the form of a WM-Bus signalling frame, that is to say a frame in accordance with the WM-Bus standard comprising an SND-IR symbol as defined in table 24 of the standard, referred to as a WM-Bus hello frame. For example, the predefined period lasts for fifteen minutes.

In a step 403, the intermediate unit IU 13A receives at least one WM-Bus hello frame by means of its communication module COM_B2 353.

In a step 404, preferably occurring between the launch step 401 and the end of the predefined period, the user presses on one of the buttons of the user interface USI 303 of the centralised meter CM 12C. This manipulation of the button is then captured by the control module CTRL_A 302 which, in a step 405, causes the sending, by the communication module COM_A2 305, of a downlink G3-PLC pairing frame, that is to say a downlink G3-PLC frame in which the control byte is at 0x09 or 0x10. It is assumed here that one of the buttons causes a pairing with a gas meter and that the other button causes a pairing with a water meter.

In a step 406, the intermediate unit IU 13A receives the downlink pairing frame by means of its communication module COM_B1 354. From this reception, the control module CTRL_B 352 knows that a pairing has been requested by a centralised meter CM. Thus, whereas up until then the control module CTRL_B 352 did not take into account any receptions of uplink WM-Bus hello frames, it now knows that reception of an uplink WM-Bus hello frame must cause a pairing.

In a step 407, the fluid meter G 14A, which is still in the predefined period, sends a new uplink WM-Bus hello frame by means of its communication module COM_C 372.

This uplink WM-Bus hello frame is received by the communication module COM_B2 353 from the intermediate unit 13A in a step 408.

In a step 409, the predefined period ends and the fluid meter G 14A ends the sendings of uplink WM-Bus frames.

Reception of an uplink WM-Bus hello frame by the intermediate unit IU 13A causes the sending of a so-called pairing-successful uplink G3-PLC frame, that is to say one comprising a control byte at 0x04, a first payload byte at 0x00 or 0x02, and four bytes identifying the fluid meter G 14A. It is assumed here that the intermediate unit IU 13A knows the identifier of each fluid meter that is connected thereto.

In a step 411, the communication module COM_A2 305 receives the pairing-successful uplink G3-PLC frame.

Reception of the pairing-successful uplink G3-PLC frame by the centralised meter CM 12C causes the sending, in a step 412, of a request for an encryption key for the fluid meter G 14A intended for the management entity 15. This request is made via the data concentrator DC 11. The request for an encryption key comprises the identifier of the fluid meter G 14A so that the management entity 15 transmits an encryption key corresponding to this fluid meter. Once recovered, the encryption key is transmitted to the intermediate unit IU 13A in a step 413. To do this, the centralised meter CM 12C sends a so-called encryption-key transport downlink G3-PLC frame. The encryption-key transport downlink G3-PLC frame comprises a control byte at 0x0B or at 0x0C and sixteen bytes comprising the encryption key. In step 413, the control module CTRL_A 302 instances an emulation application emulating a virtual fluid meter able to communicate directly with the data concentrator 11 on behalf of the fluid meter G 14A.

In a step 414, the intermediate unit IU 13A receives the encryption-key transport downlink G3-PLC frame. As soon as this frame is received, the control module CTRL_B 352 knows that all the communications between the intermediate unit IU 13A and the fluid meter G 14A must be encrypted using the encryption key of the fluid meter G 14A received. Step 414 ends a pairing phase between the centralised-meter system comprising the centralised meter CM 12C and the intermediate unit IU 13A and the fluid meter G 14A. The control module CTRL_A 302 therefore considers that the centralised meter CM 12C (and therefore the corresponding centralised-meter system) is paired with the fluid meter G 14A when it receives at least one signalling frame (i.e. an uplink WM-Bus hello frame) from said fluid meter G 14A and, in one embodiment, that it has obtained the encryption key corresponding to said fluid meter G 14A.

Following this pairing phase, an index-transmission phase can begin.

During this phase, the fluid meter G 14A sends so-called index-transmission uplink WM-Bus frames at regular predefined intervals, for example every day, and goes on standby between each sending. Each index-transmission uplink WM-Bus frame corresponds to a frame in accordance with the WM-Bus standard comprising an SND-NR symbol as defined in table 24 of the standard. The index type, the index and the timestamp information constitute information representing a fluid-consumption reading. In FIG. 4, we have shown two sendings of index-transmission uplink WM-Bus frames in steps 415 and 417.

These two index-transmission uplink WM-Bus frames are received by the intermediate unit IU 13A respectively in steps 416 and 418. When an index-transmission uplink WM-Bus frame is received, the control module CTRL_B 352 stores the value of the information representing fluid consumption contained in this frame.

In a step 419, the control module CTRL_A of the centralised meter CM 12C triggers a reading of the fluid meter G 14A. To do this, it sends a so-called reading downlink G3-PLC frame to the intermediate unit IU 13A. Each reading downlink G3-PLC frame comprises a control byte at 0x07 or at 0x08 and an empty payload.

In a step 420, the intermediate unit IU 13A receives the reading downlink G3-PLC frame. Following reception of this frame, the control module CTRL_B 352 recovers the last information value representing fluid consumption that it received for the fluid meter to which the reading downlink G3-PLC frame related.

In a step 421, the intermediate unit IU 13A sends a so-called index-transmission uplink G3-PLC frame. The index-transmission uplink G3-PLC frame comprises a control byte at 0x02 and a payload comprising a byte of the index type at 0x01 or 0x02, four bytes corresponding to the last index value and six bytes comprising the timestamp information corresponding to said last index. The content of this frame is encrypted using the encryption key received in step 414.

In a step 422, the centralised meter CM 12C receives the index-transmission uplink G3-PLC frame. The virtual fluid meter emulating the fluid meter G 14A is then responsible for retransmitting the content of the index-transmission uplink G3-PLC frame, i.e. the index and the timestamp information, to the management entity 15 via the data concentrator DC 11.

It should be noted that, if no uplink WM-Bus frame is received by the intermediate unit IU 13A after a predefined period, for example fifteen minutes, following the reception of the pairing downlink G3-PLC frame in step 406, the control module CTRL_B 352 causes a sending, by the communication module COM_B1 354, of a so-called "pairing-failure" uplink G3-PLC frame to the centralised meter CM 12C. The pairing-failure uplink G3-PLC frame comprises a control byte equal to 0x04, a first payload byte equal to 0x01 or 0x03 and four bytes identifying the fluid meter G 14A. When a pairing-failure uplink G3-PLC frame is received, the centralised meter CM 12C transmits information to the management entity 15 via the data concentrator DC 11 informing the management entity 15 that action on the fluid meter G 14A is necessary.

Figure 5:
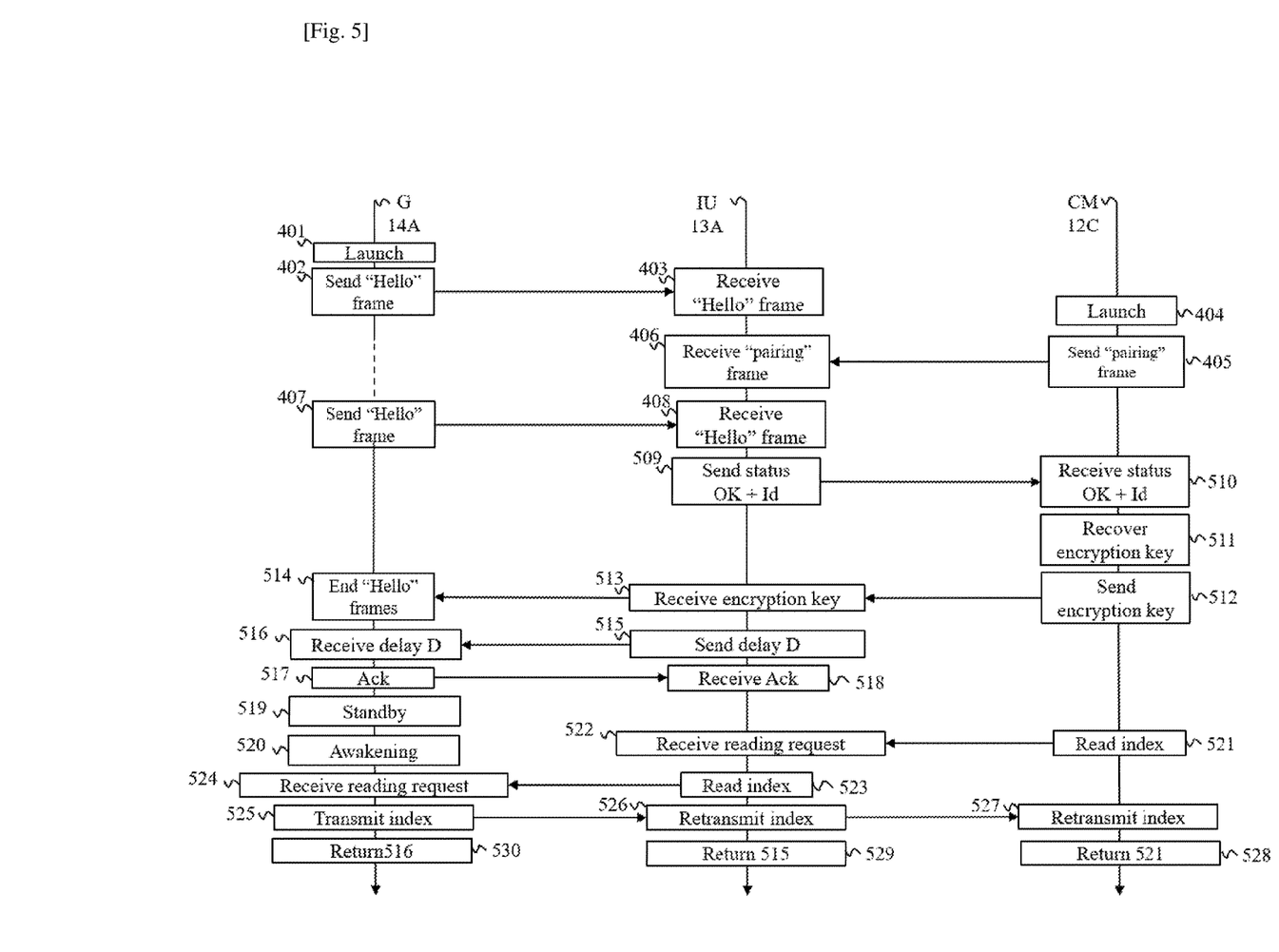
FIG. 5 illustrates schematically a second embodiment of a method for reading fluid meters.

FIG. 5 illustrates schematically a second embodiment of a fluid-meter reading method.

In the embodiment in FIG. 5, the fluid meter G 14A is bidirectional, that is to say it can send and receive frames.

The method in FIG. 5 repeats the steps 401 to 408 identically. The step 408 is followed by the steps 509, 510, 511 and 512 respectively identical to the steps 410, 411, 412 and 413. The step 512 is followed by a step 513 during which the intermediate unit IU 13A receives the encryption-key transport downlink G3-PLC frame from the meter G 14A. As soon as this frame is received, the control module CTRL_B 352 knows that all the communications between the intermediate unit IU 13A and the fluid meter G 14A must be encrypted using the encryption key received. In the step 513, the intermediate unit IU 13A transmits a so-called pairing successful downlink WM-Bus frame to the fluid meter G 14A. The pairing-successful downlink WM-Bus frame with a frame in accordance with the WM-Bus standard comprising a CNF-IR symbol as defined in table 25 of the standard.

In a step 514, the fluid meter G 14A receives the pairing-successful downlink WM-Bus frame. The reception of this frame ends the sending of the uplink WM-Bus hello frames by the fluid meter G 14A. It is therefore the step 514 that ends the pairing phase between the centralised-meter system comprising the centralised meter CM 12C and the intermediate unit IU 13A and the fluid meter G 14A.

Following this pairing phase, an index-transmission phase can begin.

The index transmission phase follows the pairing phase.

In a step 515, the control module CTRL_B 352 causes a sending, by the communication module COM_B2 353, of a predefined delay D in a downlink WM-Bus frame comprising an SND-UD symbol as defined in table 24 of the standard and four bytes representing the predefined delay D expressed in seconds remaining before the next awakening. The predefined delay D is for example equal to 24 hours.

In a step 516, the fluid meter G 14A receives the downlink WM-Bus frame containing the predefined delay D by means of its communication module COM_C 372. The predefined delay is used by the control module CTRL_C 370 for fixing a standby time for the fluid meter G 14A following a successful index reading.

In a step 517, the fluid meter G 14A transmits a so-called acknowledgement uplink WM-Bus frame to the intermediate unit IU 13A in order to acknowledge reception of the predefined delay D. The acknowledgement uplink WM-Bus frame corresponds to a frame in accordance with the WM-Bus standard comprising an ACK symbol as defined in the table 25 of the standard.

In a step 518, the intermediate unit IU 13A receives the acknowledgement uplink WM-Bus frame.

It should be noted that, if the intermediate unit IU 13A does not receive an acknowledgement uplink WM-Bus frame at the end of a period $D_{Timeout}$, for example equal to 10 seconds, following execution of the step 515, it sends a downlink WM-Bus frame containing the predefined delay D. If at the end of K attempts (for example K=3) no acknowledgement uplink WM-Bus frame is received, the intermediate unit considers that it is necessary to re-pair the fluid meter G 14A and informs the management entity 15 thereof.

In a step 519, following the sending of the acknowledgement uplink WM-Bus frame, the control module CTRL_C 370 puts the fluid meter G 14A on standby during the predefined period D. At the end of the predefined period D, the control module CTRL_C 370 awakens the fluid meter G 14A in a step 520. In one embodiment, as from this awakening, the fluid meter G 14A remains awake until it receives an index-reading request.

In a step 521, the control module CTRL_A 302 of the centralised meter CM 12C causes the sending of a reading downlink G3-PLC frame to the intermediate unit IU 13A.

In a step 522, the intermediate unit IU 13A receives the reading downlink G3-PLC frame. The control module CTRL_B 352 knows that the fluid meter may be in standby mode but also knows, since it has fixed the predefined delay D, how much time at a maximum the fluid meter G 14A can remain in standby mode. The control module CTRL_B 352 then deduces from this when, in a step 523, to send a so-called reading downlink WM-Bus frame. It is then said that the intermediate unit IU 13A and the fluid meter G 14A are synchronised. The reading downlink WM-Bus frame corresponds to a frame in accordance with the WM-Bus standard comprising a symbol REQ-UTD as defined in the table 24 of the standard.

In a step 524, when it is in an awake period, the fluid meter G 14A receives the reading downlink WM-Bus frame.

In a step 525, the control module CTRL_C 370 causes a sending, by the communication module COM_C 372, of an index-transmission uplink WM-Bus frame. The index-transmission uplink WM-Bus frame corresponds to a frame in accordance with the WM-Bus standard comprising a symbol RSP-UD as defined in the table 25 of the standard and comprising 4 bytes representing the index of the fluid meter G 14A.

In a step 526, the intermediate unit IU 13A receives the index-transmission uplink WM-Bus frame and retransmits the content thereof in an index-transmission uplink G3-PLC frame to the centralised meter CM 12C. In a step 527, the centralised meter CM 12C receives the index-transmission uplink G3-PLC frame. The virtual fluid meter emulating the fluid meter G 14A then takes responsibility for retransmitting the content of the index-transmission uplink G3-PLC frame, i.e. the index and the timestamp information, to the management entity 15 via the data concentrator DC 11.

In a step 528, the control module CTRL_A 302 returns to the step 521 in order to send a reading downlink G3-PLC frame.

In a step 529, the control module CTRL_B 352 returns to the step 515 in order to send a predefined delay D.

In a step 530, the control module CTRL_C 370 returns to the step 516 and awaits reception of a predefined delay D.

It should be noted that, there also, if no uplink WM-Bus frame is received by the intermediate unit IU 13A after a predefined period following the reception of the pairing downlink G3-PLC frame in the step 406, the control module CTRL_B 352 causes a sending, by the communication module COM_B1 354: of a so-called "pairing failure" uplink G3-PLC frame to the centralised meter CM 12C. When a pairing-failure uplink G3-PLC frame is received, the centralised meter CM 12C transmits information to the management entity 15 via the data concentrator DC 11 informing the management entity 15 that action on the fluid meter G 14A is necessary.

In one embodiment, the intermediate unit IU 13A sends a predefined delay D only once. In this embodiment, in the step 529, the control module CTRL_B 352 returns to the step 523. Moreover, the control module CTRL_C 370 puts the fluid meter G 14A on standby (step 519) during the predefined delay D following the step 525 without awaiting reception of a new predefined delay D.

In one embodiment, the intermediate unit IU 13A and the fluid meter G 14A are desynchronised, even if the intermediate unit IU 13A has supplied a predefined period D to the fluid meter G 14A. In this embodiment, following the reception of the reading downlink G3-PLC frame in the step 522, the control module CTRL_B 352 causes sendings, at regular intervals, of reading downlink frames WM-Bus until a first index-transmission uplink WM-Bus frame is received. The transmission of the reading downlink WM-Bus frames therefore ceases as soon as the first index-transmission uplink WM-Bus frame is received.

Figure 6:
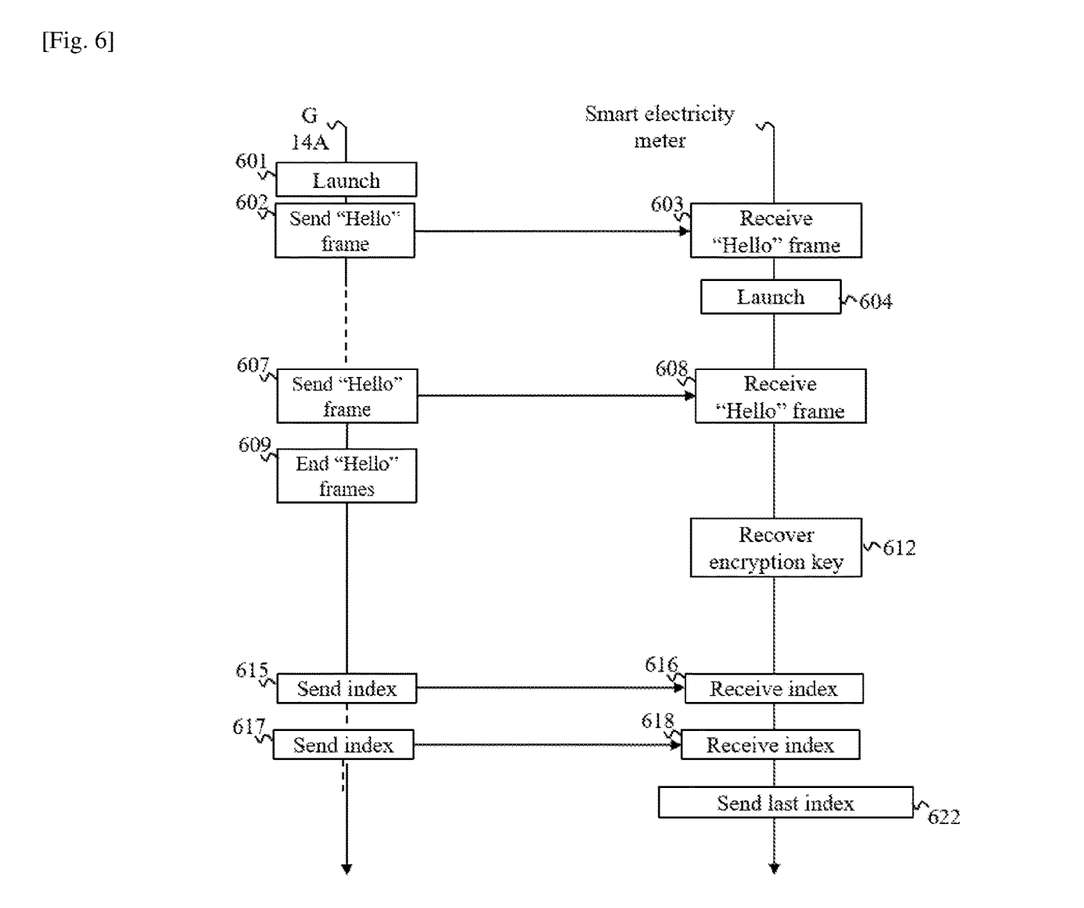
FIG. 6 illustrates schematically a third embodiment of a method for reading fluid meters.

FIG. 6 illustrates schematically a third embodiment of a method for reading fluid meters. The context of FIG. 6 is that of a smart electronic meter integrating an intermediate unit IU. In this case, the smart electricity meter forms all by itself the centralised-meter system. In FIG. 6, the fluid meter is unidirectional.

In a step 601, identical to step 401, a user presses the button of the user interface USI 371 of the fluid meter G 14A. The control module CTRL_C 370 of the fluid meter G 14A captures this action on the button.

In a step 602, identical to step 402, the control module CTRL_C 370 causes the sending, by the communication module COM_C 372, of a plurality of WM-Bus signalling frames referred to as WM-Bus hello frames for a predefined period. For example, the predefined period lasts for fifteen minutes.

In a step 603, the smart electricity meter receives at least one WM-Bus hello frame by means of its communication module COM_A3 306.

In a step 604, preferably occurring between the launch step 601 and the end of the predefined period, the user presses on one of the buttons of the user interface USI 303 of the smart electricity meter. This manipulation of the button is then captured by the control module CTRL_A 302, which awaits reception of a WM-Bus hello frame.

In a step 607, identical to the step 407, the fluid meter G 14A, which is still in the predefined period, sends a new uplink WM-Bus hello frame by means of its communication module COM_C 372.

This uplink WM-Bus hello frame is received by the communication module COM_A3 306 of the smart electricity meter in a step 608.

Reception of the latter uplink WM-Bus frame causes the sending, in a step 612, of a request for an encryption key for the fluid meter G 14A to the management entity 15. This request is made via the data concentrator DC 11. In the step 612, the control module CTRL_A 302 instances an emulation application emulating a virtual fluid meter able to communicate directly with the data concentrator 11 for the fluid meter G 14A.

In a step 609, which is identical to the step 409, the predefined period ends and the fluid meter G 14A ends the sendings of uplink WM-Bus frames.

Step 609 ends at the pairing phase between the centralised-meter system comprising the centralised meter CM 12C and the intermediate unit IU 13A and the fluid meter G 14A.

Following this pairing phase, the index-transfer phase can begin.

During this phase, the fluid meter G 14A transmits index-transmission uplink WM-Bus frames at regular intervals, for example every day. In FIG. 6, we have shown two sendings of index-transmission uplink WM-Bus frames during the steps 615 and 617.

These two index-transmission uplink WM-Bus frames are received by the smart electricity meter respectively in the steps 616 and 618. When an index-transmission uplink WM-Bus frame is received, the control module CTRL_A 302 stores the information representing a reading of fluid consumption contained in this frame.

In a step 622, the virtual fluid meter emulating the fluid meter G 14A takes responsibility for retransmitting the last index received by the smart electricity meter and the corresponding timestamp information to the management entity 15 via the data concentrator DC 11.

Figure 7:
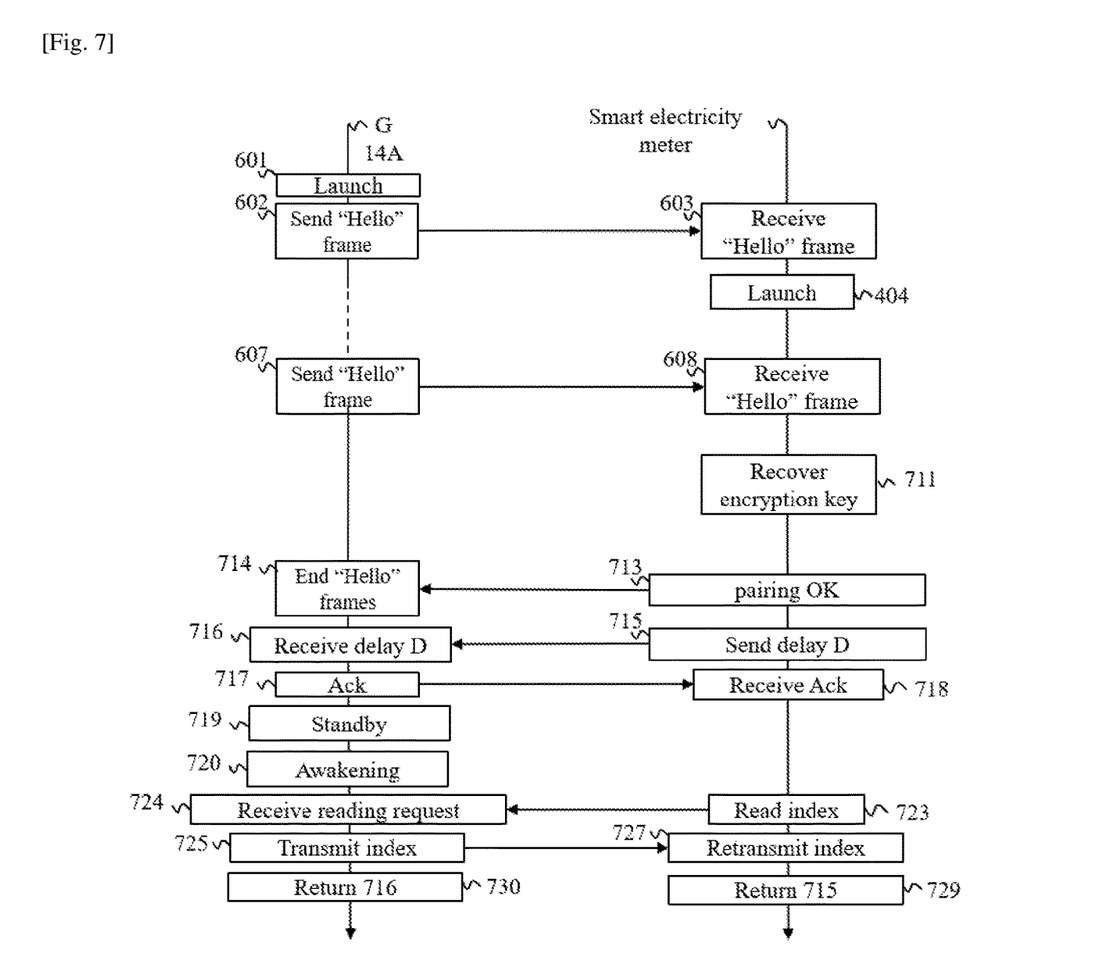
FIG. 7 illustrates schematically a fourth embodiment of a method for reading fluid meters.

FIG. 7 illustrates schematically a fourth embodiment of a method for reading fluid meters. The context of FIG. 7 is that of a smart electronic meter integrating an intermediate unit IU. In this case, the smart electricity meter all by itself forms the centralised-meter system. In FIG. 7, the fluid meter is bidirectional.

The method in FIG. 7 repeats the steps 601, 602, 603, 607 and 608 identically. The step 608 is followed by a step 711 identical to the step 612. The step 711 is followed by a step 713, during which the smart electricity meter transmits a pairing-successful downlink WM-Bus frame to the fluid meter G 14A.

In a step 714, identical to the step 514, the fluid meter G 14A receives the pairing-successful downlink WM-Bus frame. Reception of this frame ends the sending of the uplink WM-Bus hello frames by the fluid meter G 14A.

The step 714 therefore ends the pairing phase between the smart electricity meter and the fluid meter G 14A.

Following this pairing phase, the index-transfer phase can begin.

In a step 715, the control module CTRL_A 302 causes a sending, by the communication module COM_A3 306, of a predefined delay D in a downlink WM-Bus frame as described in the step 515. The predefined delay D is for example equal to 24 hours.

In a step 716, the fluid meter G 14A receives the downlink WM-Bus frame containing the predefined delay D by means of its communication module COM_C 372. The predefined delay is used by the control module CTRL_C 370 to fix a standby time of the fluid meter G 14A following a successful index reading.

In a step 717, identical to the step 517, the fluid meter G 14A transmits an acknowledgement uplink WM-Bus frame to the intermediate unit IU 13A in order to acknowledge reception of the predefined delay D.

In a step 718, the smart electricity meter receives the acknowledgement uplink WM-Bus frame as described in the step 517.

In a step 719, identical to step 519, following the sending of the acknowledgement uplink WM-Bus frame, the control module CTRL_C 370 puts the fluid meter G 14A on standby during the predefined period D. At the end of the predefined period D, the control module CTRL_C 370 wakes the fluid meter G 14A in a step 720, identical to the step 520. In one embodiment, as from this awakening, the fluid meter G 14A remains awake until it receives an index-reading request.

In a step 723, the smart electricity meter sends a reading downlink WM-Bus frame to the fluid meter G 14A. It is assumed here that the smart electricity meter and the fluid meter G 14A are synchronised.

In a step 724, identical to the step 524, the fluid meter G 14A receives the reading downlink WM-Bus frame.

In a step 725, identical to the step 525, the control module CTRL_C 370 causes a sending, by the communication module COM_C 372, of an index-transmission uplink WM-Bus frame.

In a step 727, the smart electricity meter receives the index-transmission uplink WM-Bus frame. The virtual fluid meter emulating the fluid meter G 14A then takes responsibility for retransmitting the content of the index-transmission uplink WM-Bus frame, i.e. the index and the timestamp information, to the management entity 15 via the data concentrator DC 11.

In a step 729, the control module CTRL_A 302 returns to the step 715 in order to send a predefined delay D to the fluid meter G 14A.

In a step 730, the control module CTRL_C 370 returns to the step 716 and awaits reception of a predefined delay D.

The invention claimed is:

1. A method for the remote automated reading of a fluid meter executed in an automated metering management system in the context of a fluid-distribution service, comprising a fluid meter and a system, referred to as a centralised-meter system, the fluid meter being able to transmit frames in accordance with a wireless communication standard to the centralised-meter system, the centralised-meter system being able to receive said frames and to communicate by powerline with a data concentrator in a first frequency band via a first network of the powerline communication network type, said data concentrator communicating with a management entity of the automated metering management system via a second network, wherein, the centralised-meter system comprising a centralised meter and an intermediate unit both associated with said fluid meter, the centralised meter and the intermediate unit being two separate devices able to communicate with one another by powerline in a second frequency band not overlapping said first frequency band via a third network of the powerline communication network type distinct from said first network, the method comprising:

performing a phase of pairing between the centralised-meter system and the fluid meter wherein the intermediate unit receives each signalling frame sent by the fluid meter and considers that the centralised-meter system and the fluid meter are paired when it receives a signalling frame following a reception of a frame containing information representing a pairing request from the centralised meter and, when it is paired with the fluid meter, instances an emulation application emulating a virtual fluid meter able to communicate directly with the data concentrator on behalf of said fluid meter; and performing an index transmission phase during which the centralised-meter system receives frames from the fluid meter each comprising information representing a fluid-consumption reading, the virtual fluid meter taking responsibility for retransmitting said information representing a fluid-consumption reading to the management entity via the data concentrator.

2. The method according to claim 1, wherein the pairing phase further comprises, following the reception by the centralised metering system of a signalling frame among a plurality of signalling frames transmitted by the fluid meter during the pairing phase, transmitting, from the centralised metering system, to the fluid meter, a frame comprising information representing a successful pairing, the reception of the frame comprising the information representing the successful pairing by the fluid meter ending the transmission of the plurality of signalling frames.

3. The method according to claim 2, wherein, during the index transmission phase, the centralised-meter system fixes a predefined duration of standby of the fluid meter, the fluid meter going on standby for a predefined period after each sending of a frame comprising information representing a fluid-consumption reading.

4. The method according to claim 2, wherein the centralised-meter system transmits a frame, referred to as a reading frame, requesting the sending of a frame comprising information representing a fluid-consumption reading to the fluid meter in order to obtain from the fluid meter a frame comprising information representing a fluid-consumption reading.

5. The method according to claim 1, wherein, the signalling frame enabling the centralised-meter system to consider itself to be paired with the fluid meter during the pairing phase forms part of a plurality of signalling frames transmitted by the fluid meter during a predefined period.

6. The method according to claim 5, wherein, the frames comprising information representing a fluid-consumption reading coming from the fluid meter during the index transmission phase are sent at regular predefined intervals, the fluid meter going on standby between each sending.

7. The method according to claim 1, wherein, in the event of successful pairing between the fluid meter and the centralised-meter system, the intermediate unit transmits a frame containing information representing a successful pairing to the centralised meter, a reception of a frame containing information representing a successful pairing by the centralised meter causing an obtaining, by the centralised meter, of an encryption key corresponding to said fluid meter and a transmission, by the centralised meter to the intermediate unit, of said encryption key so that each communication between said fluid meter and the intermediate unit can be encrypted.

8. The method according to claim 1, wherein each transmission of a reading frame by the centralised-meter system comprises a transmission of a first reading frame by the intermediate unit to the fluid meter, the transmission of said first reading frame being caused by the reception of a second reading frame from the centralised meter.

9. The method according to claim 1, wherein the emulation application emulating a virtual fluid meter is instanced by the centralised meter, each frame comprising information representing a fluid-consumption reading received by the centralised-meter system is received by the intermediate unit, which retransmits it to the centralised meter so that the virtual fluid meter that it has instanced can retransmit said information representing a fluid-consumption reading to the management entity via the data concentrator.

10. A system, referred to as a reading system, used in an automated metering management system in the context of a fluid-distribution service, said automated metering management system comprising a plurality of fluid meters, wherein the reading system comprises at least one first communication module in accordance with a wireless communication standard used by a fluid meter and a second communication module suitable for communicating by powerline with a data concentrator in a first frequency band via a first network of the powerline communication network type, said data concentrator communicating with a management entity of the automated metering management system via a second network, and wherein the reading system comprises means for instancing an emulation application emulating a virtual fluid meter able to communicate directly with the data concentrator for each fluid meter in the plurality, and, for each fluid meter in the plurality, the corresponding virtual fluid meter takes responsibility for retransmitting information, representing a fluid-consumption reading, supplied to the reading system by said fluid meter in the plurality to the management entity via the data concentrator, the system comprising:

at least one intermediate unit, each intermediate unit comprising a communication module identical to the first communication module and being associated with a fluid meter in the plurality of the water meter type and/or a fluid meter in the plurality of the gas meter type, and a centralised meter comprising the second communication module and the means for instancing an emulation application emulating a virtual fluid meter able to communicate directly with the data concentrator for each fluid meter in the plurality, each intermediate unit and the centralised meter being two separate devices and comprising a communication module suitable for communicating with each other by powerline in a second frequency band, not overlapping said first frequency band, via a third network of the powerline communication network type distinct from said first network.

11. An intermediate unit used in an automated metering management system in the context of a fluid-distribution service, said automated metering management system comprising a plurality of fluid meters, wherein the intermediate unit is associated with a fluid meter in the plurality of the water meter type and/or a fluid meter in the plurality of the gas meter type and comprises a first communication module in accordance with a wireless communication standard used by each fluid meter in the plurality and a second communication module suitable for communicating by powerline with a centralised meter in a first frequency band via a first network of the powerline communication network type, said centralised meter being separate from said intermediate unit and being suitable for communicating by powerline in a second frequency band not overlapping said first frequency band via a second network, distinct from said first network, of the powerline communication network type with a data concentrator, said data concentrator communicating with a management entity of the automated metering management system via a third network, the intermediate unit being able to relay information representing fluid consumption transmitted by each fluid meter to which said unit is attached to the centralised meter so that said centralised meter can relay said information to the management entity via the data concentrator.

12. A centralised meter used in an automated metering management system in the context of a fluid-distribution service, said automated metering management system comprising a plurality of fluid meters, wherein the centralised meter is associated with at least one intermediate unit according to claim 11 and is separate from said intermediate unit, and comprises a third communication module for communicating by powerline with each intermediate unit in a first frequency band via the first network and a fourth communication module for communicating by powerline in a second frequency band, not overlapping the first frequency band, via the second network, distinct from said first network, with the data concentrator, and means for instancing an emulation application emulating a virtual fluid meter able to communicate directly with the data concentrator for each fluid meter in the plurality, and, for each fluid meter in the plurality, the corresponding virtual fluid meter takes responsibility for retransmitting information, representing a fluid-consumption reading, supplied to the reading system by said fluid meter in the plurality to the management entity via the data concentrator.

* * * * *